June 23, 1964  G. FEHER ET AL  3,138,371
DRINKING CUP WITH INTEGRAL STIRRER
Filed May 28, 1963
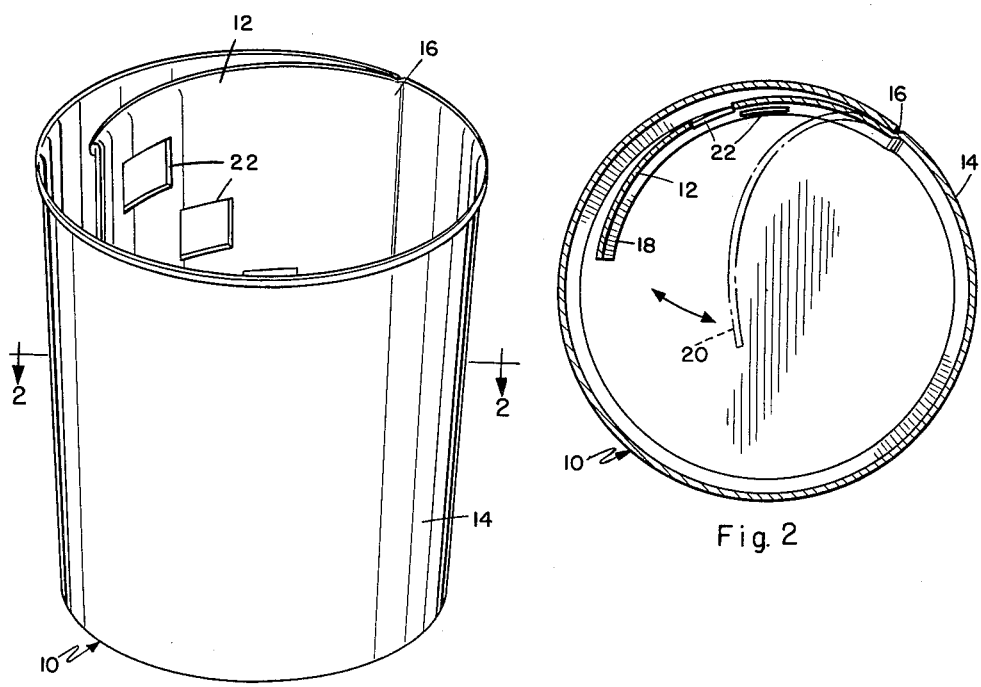
Fig. 1
Fig. 2
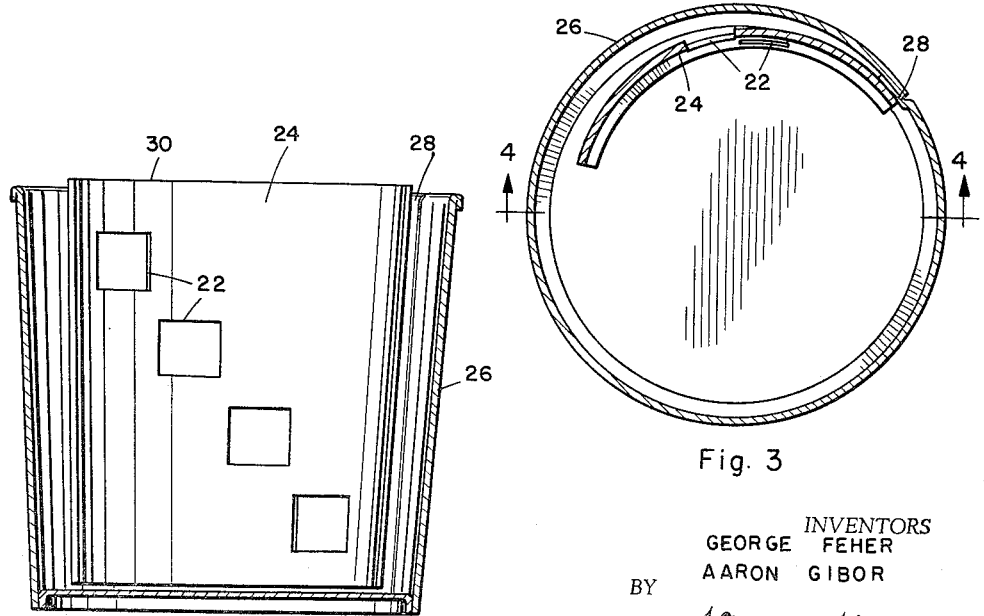
Fig. 4
Fig. 3
INVENTORS
GEORGE FEHER
AARON GIBOR
BY
Knox & Knox

United States Patent Office 3,138,371
Patented June 23, 1964

3,138,371
DRINKING CUP WITH INTEGRAL STIRRER
George Feher, University of California, La Jolla, Calif., and Aaron Gibor, Rockefeller Institute, New York 21, N.Y.
Filed May 28, 1963, Ser. No. 283,783
6 Claims. (Cl. 259—113)

This invention relates generally to drinking cups and particularly to disposable drinking cups with integral stirring means.

BACKGROUND

Machines for dispensing refreshments, such as coffee, hot chocolate, and other beverages, usually provide a choice of flavoring ingredients, such as sugar and powdered cream. Dispensing machines deliver the selected combination in a single, disposable cup, not completely mixed, and without means for stirring the mixture. A similar situation exists when beverages are distributed by individual vendors at sports events and other public gatherings. Consequently, there is a definite need for a disposable cup incorporating simple stirring means for use under the conditions described.

Disposable cups of the general type discussed herein are known in the prior art. In prior art devices, however, the additional structure of the stirring apparatus is prohibitively expensive. Additionally, in some cups, the stirring apparatus prevents nesting and stacking, increasing the cost and inconvenience of storage and packaging, lack of the nesting capability also precluding use in machines.

OBJECTS

It is, therefore, a principal object of this invention to provide a cup having integral stirring means.

It is another object of this invention to provide a cup having integral stirring means in which said stirring means does not interfere with nesting and stacking a number of cups. It is still another object of this invention to provide a cup having integral stirring means that may be held and stirred with one hand.

It is yet another object of this invention to provide a cup having integral stirring means in which said stirring means adds little to production, packaging and distribution costs.

With these and other objects definitely in view, this invention consists in the novel combination and arrangement of elements as will be hereinafter fully described in the specification, particularly pointed out in the claims, and illustrated in the drawings that form a material part of this disclosure, and in which:

FIGURE 1 is a perspective view of the invention;
FIGURE 2 is a cross section taken on line 2—2 of FIGURE 1 showing stirrer movement;
FIGURE 3 is similar to FIGURE 2 showing an alternative means of attaching the stirrer to the cup; and
FIGURE 4 is a cross section taken on line 4—4 of FIGURE 3 showing the stirrer top edge extending above the cup top edge.

Similar characters of reference indicate similar or identical elements and portions throughout the specification and throughout the views of the drawing.

DETAILED DESCRIPTION

In FIGURES 1 and 2, a cup 10 is shown with an internal stirring flap 12. The cup side wall 14 and stirring flap 12 are composed of one piece of sheet material and sealed along the vertical or near vertical dimension 16. The top edge portions of flap 12 and side wall 14 are, in this embodiment, flush with each other. The vertical dimensions of flap 12 and side wall 14 are approximately equal, providing just enough clearance at the bottom for stirring flap 12 to swing back and forth as illustrated by the arrow and positions 18 and 20 of the flap in FIGURE 2. Perforations 22 in flap 12 facilitate circulation of the contents when flap 12 is swung back and forth in the cup. The area of stirring flap 22 is not critical, the upper limiting factor being adequate clearance between the free edge of stirring flap 12 and side wall 14.

An alternative stirring flap arrangement is illustrated in FIGURES 3 and 4. In this embodiment, stirring flap 24 and cup side wall 26 are composed of two pieces. Side wall 26 is sealed and flap 24 is attached along vertical dimension 28. The upper edge portion 30 of flap 24 extends above the upper edge portion of side wall 26, providing a projecting portion for easy manipulation of flap 24. Otherwise, the two embodiments are the same.

As manufactured, stirring flap 12 fits snugly with adjacent side wall 14 permitting nesting and stacking for cup storage and packaging. The stirring flap may be provided in various kinds of disposable cups, such as paper or plastic, the main limitation being the material must be flexible to permit swinging at the juncture of the stirring flap with the cup side wall. While a cylindrical cup is illustrated, rectangular and other configurations may be used. The shape, size, and pattern of the stirring flap perforations also is a matter of choice.

It is understood that minor variation from the form of the invention disclosed herein may be made without departure from the spirit and scope of the invention, and that the specification and drawing are to be considered as merely illustrative rather than limiting.

We claim:

1. A container having means for stirring the contents thereof, comprising:
    a cup; and
    a stirring flap extending internally, parallel to a side wall of said cup, one edge portion of said flap being attached to said side wall and said flap being capable of swinging from said side wall inwardly of the cup for stirring the contents of said cup.

2. A container having means for stirring the contents thereof, comprising:
    a cup; and
    a perforated, stirring flap extending internally, parallel to a side of said cup, one edge portion of said flap being attached to the side wall of said cup permitting swinging said flap back and forth for stirring the contents of said cup, the vertical dimension of said flap and said side wall being approximately equal.

3. Apparatus according to claim 2 in which said flap is an overlapping extension of said wall.

4. Apparatus according to claim 2 in which said flap is a separate member attached to the inner surface of said side wall.

5. Apparatus according to claim 1 in which the top edge portion of said flap extends above the top edge portion of said side wall.

6. Apparatus according to claim 1 wherein said stirring flap is apertured.

References Cited in the file of this patent

UNITED STATES PATENTS 2,323,795    Clarin _____ July 6, 1943

FOREIGN PATENTS 52,523    Denmark _____ Dec. 21, 1936